ASSOCIATIVE MEMORY DEVICES
Filed Oct. 6, 1965 2 Sheets-Sheet 1
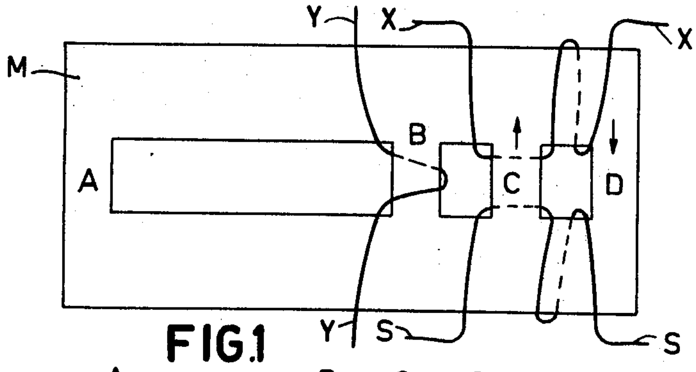
FIG. 1
| | | A | B | C | D | Y-B | X-C | X-D |
|---|---|---|---|---|---|---|---|---|
| 1) | $M_1$ | ⇑ | ⇓ | ↑ | ↓ | ↓ | ↑ | ↓ |
| 2) | $V_1$ | ↑ | ↓ | ↑ | ↓ | ↓ | | |
| 3) | $R_1$ | ↑ | ↓ | ↑ | ↓ | | ↑ | ↓ |
| 4) | $V_0$ | ↑ | ⇑ | ⇓ | ↓ | ↑ | | |
| 5) | $R_2$ | ↑ | ⇓ | ⇑ | ↓ | | ↑ | ↓ |
| 6) | $M_0$ | ⇓ | ⇑ | ↑ | ↓ | ↑ | ↑ | ↓ |
| 7) | $V_1$ | ↓ | ⇓ | ↑ | ⇑ | ↓ | | |
| 8) | R | ↓ | ⇑ | ↑ | ⇓ | | ↑ | ↓ |
| 9) | $V_0$ | ↓ | ↑ | ↑ | ↓ | ↑ | | |
| 10) | R | ↓ | ↑ | ↑ | ↓ | | ↑ | ↓ |
FIG. 2
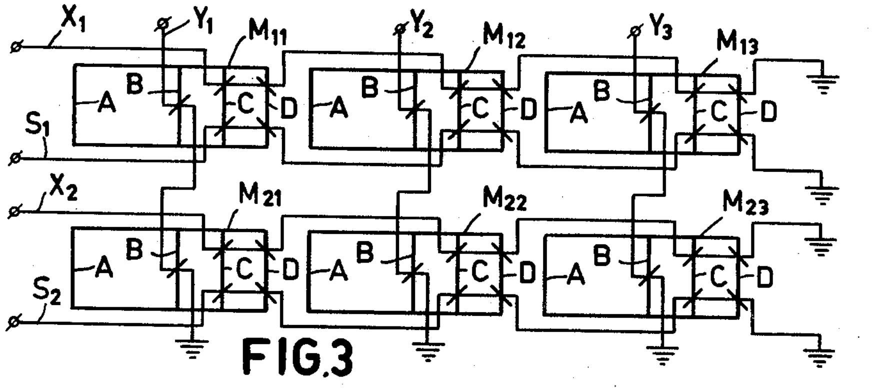
FIG. 3
INVENTOR.
HERMANES J.M.DE HAAN
BY
Frank R. Trifari
AGENT

| | | A | B | C | D | X-B | Y-C | X-D |
|---|---|---|---|---|---|---|---|---|
| 1) | $M_1$ | ⇑ | ↑ | ⇓ | ↓ | ↑ | ↓ | ↓ |
| 2) | $V_1$ | ↑ | ↑ | ↓ | ↓ | | ↓ | |
| 3) | R | ↑ | ↑ | ↓ | ↓ | ↑ | | ↓ |
| 4) | $V_0$ | ↑ | ⇓ | ⇑ | ↓ | | ↑ | |
| 5) | R | ↑ | ⇑ | ⇓ | ↓ | ↑ | | ↓ |
| 6) | $M_0$ | ⇓ | ↑ | ⇑ | ↓ | ↑ | ↑ | ↓ |
| 7) | $V_1$ | ↓ | ↑ | ⇓ | ⇑ | | ↑ | |
| 8) | R | ↓ | ↑ | ⇑ | ⇓ | ↑ | | ↓ |
| 9) | $V_0$ | ↓ | ↑ | ↑ | ↓ | | ↓ | |
| 10) | R | ↓ | ↑ | ↓ | ↓ | ↑ | | ↑ |

INVENTOR.
HERMANES J.M.DE HAAN
BY
Frank R. Jifani
AGENT 3,500,468
ASSOCIATIVE MEMORY DEVICES Hermanes Johannes Maria de Haan, Emmasingel, Eindhoven, Netherlands, assignor, by mesne assignments, to U.S. Philips Corporation, New York, N.Y., a corporation of Delaware Filed Oct. 6, 1965, Ser. No. 493,342
Claims priority, application Netherlands, Oct. 8, 1964, 6411685
Int. Cl. G11b 5/00
U.S. Cl. 340—174 8 Claims

ABSTRACT OF THE DISCLOSURE

An associative memory element constructed of a block of magnetic material having one long flux path and three shorter flux paths. A first coincident pulse couples one of the flux paths for a first direction flux, a second coincident pulse couples the second and third flux path in mutually opposite directions. The elements are arrayed in rows and columns to form a matrix.

Figure 4:
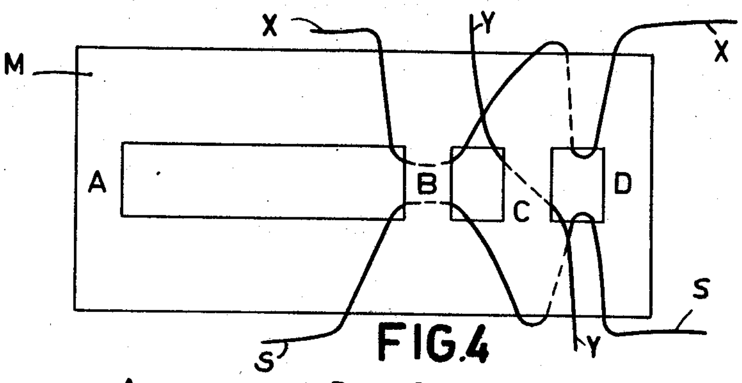

The invention relates to a device for writing information in an associative memory device.

In associative memory systems a given key word is compared with the entire content of the memory so that all information groups ("words") which satisfy the common key characteristics will be so indicated and then read out individually or as desired. In such systems it is not necessary, as in other systems, to sequentially investigate all information groups for the key characteristic, thereby eliminating an operation which is quite time-consuming.

In an article published in "Electronics" of Nov. 15, 1963, pp. 43–46, an associative memory is described wherein a number of magnetic memory elements, arranged according to rows and columns each consisting of four mutually parallel flux paths, the magnetic condition of a first flux path, the length of which is larger than that of the remaining flux paths, being characteristic of the recorded or "written" information. The recorded magnetic condition in such a construction will not be erased or diminished by reading out the information.

The second flux path of each of the magnetic elements within the same column is coupled to a common column conductor, while third and fourth flux paths of the elements of the same row (associated with a common "word") are coupled to the same row conductor. In the device described in the cited article, these conductors serve only for reading out the information and for resetting the elements to their original condition.

Writing of new information as described in the said article takes place by means of coincident currents through row and column conductors which are coupled to the first flux path of the memory elements, much in the manner of well known magnetic core matrix memories. Each of these currents have a magnitude or intensity such that the current through one of the conductors alone will not result in a significant variation of the magnetization condition (that is to say the coercive force may not be exceeded), whereas the collective action of two currents acting in coincidence in a single magnetic element are capable of producing a variation of the magnetization. A drawback of the coincident current method is that the control currents are critical and present difficulties, particularly when many elements are coupled to the same conductor.

Since over-excitation cannot be used, the writing operation runs comparatively slowly. A further drawback is that for writing information separate control conductors must be provided which cannot be used for other purposes.

The object of the invention is to provide an associative memory system which is not hindered by critical valued control currents.

A further object of the invention is to provide a novel winding pattern for an associative memory element which will avoid the problem of critical valued control currents in erasing recorded information for re-writing.

It is a still further object of the invention to provide a novel winding pattern for an associative element which will allow the same conductors to be used for reading and writing information.

In the invention, information is written in a particular magnetic memory element by simultaneously directing a current to the row conductor associated with that element, which conductor is coupled to the second flux path, and to at least one column conductor. The column conductor is coupled to the third and fourth flux paths in such a manner that the third and fourth flux paths are brought into a given mutually opposite magnetization condition, independent of the information to be written, while the second flux path, in accordance with the polarity of the current supplied to the column conductor, is brought in a magnetization condition, corresponding to the information to be written.

Because the second, third and fourth flux paths are forced into a given magnetic condition, the first flux path is now forced to assume the desired magnetization condition (which is characteristic of the written information).

It is, therefore, not necessary first to erase the existing information as is the case in coincidence memories before new information can be written. New information can be written, as it were, on the old information.

A further advantage is that the same conductors can be used both for writing and reading the information. Since the current intensities are not limited to a low limiting value, a relatvely large over-excitation may be used wherein the writing operation can be effected more rapidly than in the known device.

Figures 5, 6:
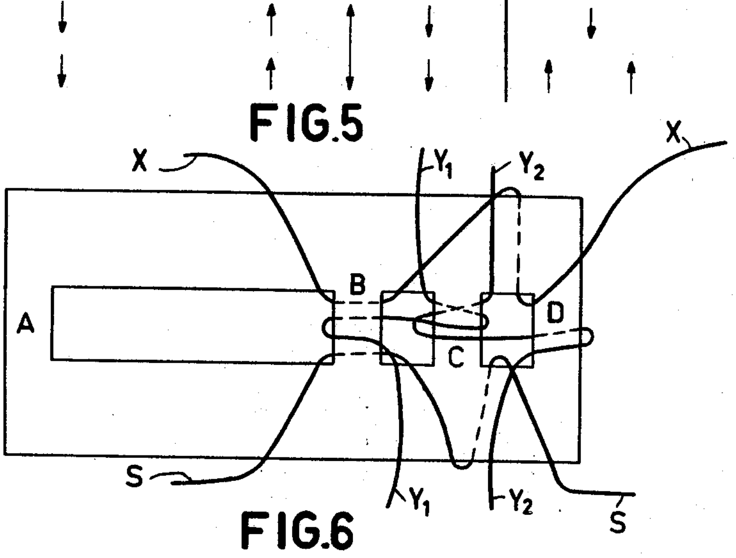

In order that the invention may readily be carried into effect it will now be described in greater detail, by way of example, with reference to the accompanying drawings, in which FIGURES 1, 4 and 6 diagrammatically show embodiments of memory elements with their wiring and FIGURES 2 and 5 are associated magnetization diagrams, while FIGURE 3 shows how the elements shown in FIGURE 1 can be combined in a matrix.

FIGURE 1 shows a magnetic memory element M of magnetic material and having a rectangular hysteresis loop characteristic. The element consists of four mutually parallel flux paths or legs A, B, C and D, enclosing one large and two small apertures. The conductor Y is threaded downwards through the large aperture, passes below the leg B and again emerges through the adjacent small aperture. The conductor Y thus forms a winding of one turn around the leg B. The conductors X and S are coupled in a similar manner but in mutually opposite senses to the legs C and D. For example, when a current flows through the conductor X the magnetic vector in the leg C will point upwards, while the magnetic vector in the leg D will point downwards, or vice versa.

FIGURE 3 diagrammatically shows a matrix with a number of elements $M_{11}$, $M_{12}$, $M_{13}$ . . . $M_{21}$, $M_{22}$, $M_{23}$ . . . which are arranged according to rows and columns and which are each constructed as shown in FIGURE 1. The sloping lines indicate the windings of the conductors $Y_1$, $Y_2$, $Y_3$, $X_1$, $X_2$, $S_1$, $S_2$ on the legs of the memory elements. The legs B of the elements of the same column are coupled to the column conductors $Y_1$, $Y_2$ and $Y_3$. Likewise the legs C and D of the elements located on the same horizontal row are coupled to a pair of common row conductors $X_1$, $S_1$ and $X_2$, $S_2$, respectively. The elements of the same row together constitute a "word."

In FIGURE 3 only a few elements are shown by way of example. In practice the number of elements will be much larger and the number of lines (words) will be very large.

Returning now to the individual elements shown in FIGURE 1 it is noted that, not counting a small leakage flux through the air, the sum of the parallel arranged fluxes in the legs A, B, C and D, must be zero, that is to say that the magnetization in two of the legs must always be directed downwards, and the magnetization in the two other legs must be directed upwards. Normally, the flux in the leg C is directed upwards and that in leg D downwards. When, as a result of reading information, the normal condition might have been lost, it can be restored by causing a resetting current to flow in the conductor X. The magnetization condition of the leg A is characteristic of the information stored in the element. For example, in the binary information condition "1" the magnetic vector points upwards, and in the condition "0" it points downwards. For these conditions, the magnetic vector in the leg B will normally have to point downwards and upwards respectively. As will be explained below, the magnetization of the leg A does not change when reading out information and when resetting to the normal condition.

When a particular information word, for example, 1, 0, 1, must be written in a given row of the matrix of FIGURE 3 (for example, the first line with the elements $M_{11}$, $M_{12}$, $M_{13}$) the conductor $X_1$ associated with that row is energized, as a result of which the C-legs of the elements concerned are magnetized upwards and the D-legs are magnetized downwards, as already noted. At the same time, positive currents are applied to the conductors $Y_1$ and $Y_3$ and a negative current is applied to the conductor $Y_2$ in a manner such that the B-legs of the elements $M_{11}$ and $M_{13}$ magnetized downwards and of the element $M_{12}$ are magnetized upwards. Since thus the legs B, C and D are forced into a given magnetization direction by the control currents the leg A must follow and assume a magnetization condition opposite to that of the leg B and independent of the condition in which the element leg A was before. The new information is thereby written on the old. The control currents may have a great intensity because when the current intensity is further increased, the legs in question will only be driven further into saturation, the flux pattern will not vary substantially, and magnetic switching can therefore take place very rapidly.

In certain circumstances, it may be difficult from a point of view of circuit technology, to conduct positive or negative currents alternately through the same Y-conductor in accordance with the information to be written. In that case it is preferable to use two conductors instead of one conductor, one of the said conductors being coupled in a positive sense and the other in a negative sense to the B-legs of the elements, so that for writing a "1" a current can be conducted through one conductor and, alternately, for writing a "0" a current can be conducted through the other conductor.

Since, as shown in FIGURE 3, the vertical conductors $Y_1$, $Y_2$ and $Y_3$ are coupled to elements other than those of the first line, the flux pattern of other elements will generally be varied when writing information in a given line, although as will be explained below, the information is not thereby influenced. In order to reset the other elements in the normal condition after writing information, the conductors $X_1$ and $X_2$ are energized for a short period of time after the currents in the vertical conductors $Y_1$, $Y_2$ and $Y_3$ are switched off.

When a number of words have to be written after one another, the resetting of the matrix in the normal condition may be delayed until the last word has been written. In fact, the resetting is necessary only to create a correct initial condition for reading out the information.

In the magnetization diagram shown in FIGURE 2 the direction of the magnetic vector in the legs A, B, C and D existing after writing the information "1" and "0" respectively, is shown on lines (1) and (6). The columns Y–B, X–C and X–D indicate in which direction of magnetization the legs B, C and D are forced by the currents in the conductors Y and X.

In an associative memory the first elements of a word generally form a given address which is characteristic of the information group, while the further information is written in the remaining elements of the word.

The address may consist, for example, of the code of a current account customer at a bank. In order to be able to read all the words which correspond to a particular address and consequently satisfy a given key-code, (for example, to collect all the entries of the current account customer of the bank) without investigating all the words for the code, a positive or a negative enquiry current is applied, in accordance with the key code, to the Y-conductors which are coupled to the elements corresponding to the address of the various words, which current combination corresponds to the current combination which was applied to the said Y-conductors when writing the address information. It will be clear that the elements of the words which correspond to the given key code will not react to these currents because the magnetic field produced by the said currents has the same direction as the already existing magnetization, whereas of the words which do not satisfy the key code, at least one of the elements will react, thereby forming an output pulse at the associated feel conductors S.

After the enquiry, a resetting pulse is applied to the resetting conductors X of the various elements to reset them in their normal condition for the next enquiry.

In the diagram of FIGURE 2 the various possibilities are shown.

Let it first be assumed that an element is in the condition 1 as is shown in the first line of FIGURE 2 and that a positive enquiry current $V_1$ is applied to the Y-conductor coupled to the B-leg. As is shown in the second and third line of the diagram of FIGURE 2, the magnetization pattern of the element does not vary any more than with the subsequent resetting pulse R through the conductor X. When, however, a negative enquiry current $V_0$ is applied to the conductor Y, establishing a magnetic flux on the leg B which is opposite to the existing magnetization, the magnetic flux in the leg B will reverse its direction as is shown in the fourth line of FIGURE 2. Since as already noted, the magnetic vector of two of the legs will always have to point upwards and will have to point downwards in the two other legs, the flux also in one of the other legs will similarly vary, namely in the leg C, as shown in FIGURE 2.

The flux in the leg B cannot flow away through the leg D because this is already saturated in the direction concerned. Although in principle the flux in the leg B could close through the leg A, in which consequently the magnetization direction therein would vary, this nevertheless does not take place because the length of the flux path through the leg A is larger than that through the leg C so that the magnetic field strength in the leg A remains below the coercive force and will consequently switch the leg C only. As a result of the flux variation in the leg C, an induction voltage is produced in the feel conductor S. During the subsequent resetting pulse through the conductor X, the magnetization in the leg C is reset in the normal condtion, as a result of which the magnetisation also in the leg B is restored in the original direction. In this case again an output pulse is produced in the feel conductor S.

When the element was in the condition "0" as shown in the sixth line of FIGURE 2, the magnetization of the leg B will reverse its direction when a positive pulse is applied to the conductor X, and in this case the magnetization of the leg D also will reverse (line 7 of FIGURE 2)

and an induction voltage is produced in the feel conductor S coupled to the leg D. Since the conductor S is coupled in the oppoiste sense to the legs C and D, the said induction voltage will have the same polarity as the induction voltage which is produced when a negative enquiry current is applied to an element which is in the "1" condition. So, when several elements of the same row of the matrix react to the enquiry pulses, their output pulses on the feel conductor S will consequently add and cannot counteract one another so that an output pulse is always produced when at least one of the said elements reacts as a proof that the address of the word does not associate with the key word. In the subsequent resetting pulse to the conductor X the magnetization in the legs B and C return to the original condition, an output pulse appearing again at the feel conductor S.

When a negative pulse is applied to the conductor Y of an element in the condition "0" no flux variation takes place, any more than in the subsequent resetting pulse, as appears from lines 9 and 10 of FIGURE 2.

As appears from the above, no output pulse appears during the associative enquiry at the feel conductors of those words of which the address associates with the key word.

The memory element shown in FIGURE 1 may have the drawback that the output pulses which occur when enquiring the element in the condtion 1 are not equally large as those in the condtion 0, as a result of which the signal-to-noise ratio is adversely influenced. This is a result of the fact that in the first case the leg C switches and in the second case the leg D switches and that the flux path through the leg C is shorter than through the leg D and consequently there is a certain dissymmetry.

This drawback is removed in the element shown in FIGURE 4. In this case the conductor Y is coupled to the leg C instead of to the leg D, while the conductors X and S are coupled to the legs B and D instead of to the legs C and D. For the rest, the operation of this element is equal to that of the element as shown in FIGURE 2, on the understanding that the functions of the legs B and C are exchanged.

FIGURE 5 shows the various magnetization conditions on the analogy of FIGURE 2.

From line 4 of FIGURE 5 it appears that, when applying a negative pulse to the Y-conductor of an element in the condition 1, the flux in the legs B and D reverses its direction while, in accordance with line 7 of FIGURE 5, the flux in the legs C and D reverses its direction when a positive enquiry current is applied to the Y-conductor of an element in the condition 0. Since the legs B and D are arranged symmetrically with respect to the leg C, the output pulses in the said cases at the conductor S are substantially equal.

The memory element shown in FIGURE 6 is constructed in a corresponding manner as that shown in FIGURE 4 and its operation also is in agreement therewith. However, the leg C is coupled to two conductors $Y_1$ and $Y_2$ instead of to one Y-conductor, which conductors in addition are coupled to the legs B and D respectively, namely each in opposite senses with respect to the coupling to the leg C, that is to say, a current in the conductor $Y_1$ will produce a flux, for example, which in the leg C, is directed downwards and, in the leg B, is directed upwards, while a current through the conductor $Y_2$ produces a flux, which, in the leg C is directed upwards, and in the leg D is directed downwards. For writing the information "1" the conductor Y is energized simultaneously with the conductor X. Likewise, for writing the information "0" the conductor $Y_2$ is energized simultaneously with the conductor X. In this case the action of the coupling of the conductors $Y_2$ and $Y_1$ to the legs B and D respectively supports the action of the conductor X on these legs.

During the associative reading of the information again one of the conductors $Y_1$ or $Y_2$ is energized. When during this reading the same conductor is energized as that which was energized during the writing, normally no variation of the magnetization takes place. Since in this case the leg C is saturated to a somewhat further extent there is, however, a small variation which produces an interference pulse on the feel conductor S. It has been found that in the memory element shown in FIGURE 6 the said interference pulse is smaller than that in the device shown in FIGURE 1 or FIGURE 4, and the signal-to-noise ratio is better. When during the associative reading the other conductor is energized than that which was energized during writing, the magnetic flux in the leg C will reverse its direction as explained above with reference to FIGURE 4. When, for example, the element is in the condition "1" as shown in the first line of FIGURE 5, and when, during the associative reading, the conductor $Y_2$ is energized, the directions of the magnetic fluxes in the legs B and C will reverse as is shown in the fourth line of FIGURE 5. The action of the current in the conductor $Y_2$ on the leg D is such that the magnetization is supported in the existing direction.

A particular advantage of the device shown in FIGURE 6 is that the resetting to the normal condition of all the elements of the memory, as is required after writing the information, can be effected by simultaneously energizing the Y-conductors. In this case, the magnetic actions of the currents through the conductors $Y_1$ and $Y_2$ on the leg C will neutralize one another while the leg B is magnetized upwards and the leg D is magnetized downwards.

It is true, the same effect can be obtained by energizing the X-conductors but since a current of a given strength is necessary per element and in practice the number of columns (number of bits per word) is much smaller than the number of rows (words) it is more economical, both from a point of view of circuit technology and as regards the total current to be applied, to effect the resetting through the Y-conductors, than through the X-conductors.

What is claimed is:

1. A magnetic circuit for storing information, comprising, a multi-apertured magnetic storage element having at least four legs defining a plurality of flux paths, the first of said legs including a first flux path having one of two magnetic information conditions and being substantially longer than any other flux path, and writing means for setting the magnetization state of said first flux path in either one of said two conditions, said writing means including first means coupling one of said remaining legs for setting a magnetization state in said first flux path in accordance with the desired one of said two conditions, and second means coupling another two of said remaining legs in mutually opposite senses independent of the information to be written for setting mutually opposite magnetization states therein, said second means establishing a second and shorter flux path.

2. The combination of claim 1 wherein said first means comprises a first conductor linking said one of said remaining legs and one of said two of said remaining legs in mutually opposite magnetization senses, and a second conductor linking said one of said remaining legs in a sense opposite to that of said first conductor and the other of said two of said remaining legs in mutually opposite magnetization senses.

3. A magnetic circuit for storing information, comprising, a multi-apertured magnetic storage element having at least four legs defining a plurality of flux paths, the first of said legs including a first flux path having one of two magnetic information conditions and being substantially longer than any other flux path, writing means for setting the magnetization state of said first flux path in either one of said two conditions, said writing means including first means coupling one of said remaining legs for setting a magnetization state in said first flux path in accordance with the desired one of said two conditions, and second means coupling another two of said remaining legs in mutually opposite senses independently of the information to be written for setting mutually opposite magnetization states therein, thereby establishing a second and shorter flux path and reading means for sensing the magnetization state of said first flux path in response to the application of a sense current to said first means and comprising third means coupling said two of said remaining legs in mutually opposite senses for providing an output indicative of the magnetization state of said first flux path in response to the application of said sense current.

4. The combination of claim 3 wherein said first means comprises a first conductor linking said one of said remaining legs and one of said two of said remaining legs in mutually opposite magnetization senses, and a second conductor linking said one of said remaining legs in a sense opposite to that of said first conductor, and the other of said two of said remaining legs in mutually opposite magnetization senses.

5. A magnetic circuit for storing information, comprising, a plurality of multi-apertured magnetic elements arranged in rows and columns, each of said elements having at least four legs defining a plurality of flux paths, the first of said legs including a first flux path having one of two magnetic information conditions and being substantially longer than any other flux path, writing means for setting the magnetization state of said first flux path in either one of said two conditions, said writing means including first means coupling one of said remaining legs for setting a magnetization state in said first flux path in accordance with the desired one of said two conditions and second means coupling another two of said remaining legs in mutually opposite senses independently of the information to be written for setting mutually opposite magnetization states therein, thereby establishing a second and shorter flux path, first interconnecting means serially linking each of said first means in each of said columns, and second interconnecting means serially linking each of second means in each of said rows.

6. The combination of claim 5 wherein said first means comprises a first conductor linking said one of said remaining legs and one of said two of said remaining legs in mutually opposite magnetization senses, and a second conductor linking said one of said remaining legs, in a sense opposite to that of said remaining legs in mutually opposite magnetization senses.

7. A magnetic circuit for storing information comprising a plurality of multi-apertured magnetic elements arranged in rows and columns, each of said elements having at least four legs defining a plurality of flux paths, the first of said legs including a first flux path having one of two magnetic information conditions and being substantially longer than any other flux path, writing means for setting the magnetization state of said first flux path in either one of said two conditions, said writing means including first means coupling one of said remaining legs for setting a magnetization state therein in accordance with the desired one of said two conditions and second means coupling another two of said remaining legs in mutually opposite senses independently of the information to be written for setting mutually opposite magnetization states therein, first interconnecting means serially linking each of said first means in each of said columns, and second interconnecting means serially linking each of said second means in each of said rows, third means coupling said two of said remaining legs in mutually opposite senses for response to a sense current applied to said element, and third interconnecting means serially linking each of said third means in each of said rows.

8. The combination of claim 7 wherein said first means comprises a first conductor linking said one of said remaining legs and one of said two of said remaining legs in mutually opposite magnetization senses, and a second conductor linking said one of said remaining legs, in a sense opposite to that of said first conductor, and the other of said two of said remaining legs in mutually opposite magnetization senses.

References Cited

UNITED STATES PATENTS

| | | | |
|---|---|---|---|
| Re. 26,313 | 11/1967 | Schwenzfeger | 340—174 |
| 3,300,760 | 1/1967 | Franks et al. | 340—174 |
| 3,106,702 | 10/1963 | Haynes et al. | 340—174 |

BERNARD KONICK, Primary Examiner

S. B. POKOTILOW, Assistant Examiner